(12) United States Patent
Jones

(10) Patent No.: US 10,593,205 B1
(45) Date of Patent: Mar. 17, 2020

(54) GPS AND WARNING SYSTEM

(71) Applicant: Timothy Jones, Chicago, IL (US)

(72) Inventor: Timothy Jones, Chicago, IL (US)

( * ) Notice: Subject to any disclaimer, the term of this patent is extended or adjusted under 35 U.S.C. 154(b) by 0 days.

(21) Appl. No.: 15/376,545

(22) Filed: Dec. 12, 2016

Related U.S. Application Data

(60) Provisional application No. 62/266,644, filed on Dec. 13, 2015.

(51) Int. Cl.
*G08G 1/0967* (2006.01)
*B60Q 9/00* (2006.01)
*G01S 19/51* (2010.01)

(52) U.S. Cl.
CPC ....... *G08G 1/096766* (2013.01); *B60Q 9/008* (2013.01); *G01S 19/51* (2013.01)

(58) Field of Classification Search
CPC .... G08G 1/096766; B60Q 9/008; G01S 19/51
See application file for complete search history.

(56) References Cited

U.S. PATENT DOCUMENTS

| | | | | |
|---|---|---|---|---|
| 5,220,507 A * | 6/1993 | Kirson | ............... | G01C 21/34 340/995.19 |
| 6,463,382 B1 * | 10/2002 | Bullock | ........... | G08G 1/096716 701/117 |
| 6,650,995 B2 * | 11/2003 | Bullock | ........... | G08G 1/096716 701/117 |
| 6,748,325 B1 * | 6/2004 | Fujisaki | ................. | G01C 21/00 701/301 |
| 6,865,476 B1 * | 3/2005 | Jokerst, Sr. | ............ | G01C 21/20 701/467 |
| 9,193,375 B2 * | 11/2015 | Schramm | ............... | B60K 35/00 |
| 2002/0120388 A1 * | 8/2002 | Bullock | ........... | G08G 1/096716 701/117 |
| 2002/0120390 A1 * | 8/2002 | Bullock | ........... | G08G 1/096716 701/117 |
| 2003/0125846 A1 * | 7/2003 | Yu | ........................ | G08G 1/0962 701/1 |
| 2004/0201495 A1 * | 10/2004 | Lim | ................. | G08G 1/096716 340/905 |
| 2005/0164673 A1 * | 7/2005 | Ehlers | .............. | G08G 1/096811 455/404.1 |
| 2007/0138347 A1 * | 6/2007 | Ehlers | ................ | G01C 21/3461 246/1 R |
| 2008/0162034 A1 * | 7/2008 | Breen | .................... | G01C 21/26 701/533 |
| 2009/0045927 A1 * | 2/2009 | Atella | .................... | G08G 1/207 340/425.5 |
| 2009/0189373 A1 * | 7/2009 | Schramm | ............... | B60K 35/00 280/731 |

(Continued)

*Primary Examiner* — Joseph H Feild
*Assistant Examiner* — Rufus C Point
(74) *Attorney, Agent, or Firm* — Bruce A. Lev

(57) ABSTRACT

A GPS and warning system is a GPS monitoring and alarm system that would warn truckers, bus and RV drivers, approaching underpasses, bridges, viaducts, tunnels, and other structures of insufficient clearance for their vehicle. With the vehicle height entered into the GPS and warning system, as well as including the actual measurements of each and every structure along with GPS coordinates, the intent is to safely alert, and reroute the driver, should the vehicle be approaching a structure with low clearance.

10 Claims, 4 Drawing Sheets

(56) References Cited

U.S. PATENT DOCUMENTS

| | | | | |
|---|---|---|---|---|
| 2010/0030466 | A1* | 2/2010 | Rogers | G01C 21/3415 701/533 |
| 2012/0083947 | A1* | 4/2012 | Anderson | B60W 50/0098 701/3 |
| 2013/0048403 | A1* | 2/2013 | Doinoff | B60K 28/063 180/272 |
| 2013/0147955 | A1* | 6/2013 | Oosugi | G08G 1/096716 348/148 |
| 2014/0066091 | A1* | 3/2014 | Varoglu | G01S 19/10 455/456.1 |
| 2015/0134240 | A1* | 5/2015 | Yamada | G01C 21/3697 701/461 |
| 2015/0179069 | A1* | 6/2015 | Cazanas | G08G 1/096775 340/905 |
| 2016/0009276 | A1* | 1/2016 | Moeller | G06F 16/162 701/41 |
| 2016/0046298 | A1* | 2/2016 | DeRuyck | B60W 40/09 340/576 |
| 2016/0288741 | A1* | 10/2016 | Shafer | B60R 16/0231 |
| 2016/0335879 | A1* | 11/2016 | Carr | H04W 4/021 |
| 2016/0351050 | A1* | 12/2016 | Takahara | H04W 4/029 |

* cited by examiner

GPS AND WARNING SYSTEM

CROSS-REFERENCE TO RELATED APPLICATION

The present application is related to and claims priority from prior provisional application Ser. No. 62/266,644, filed Dec. 13, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of vehicle underpass collision avoidance systems and more specifically relates to a GPS monitoring and alarm system that would warn truckers, bus and RV drivers, approaching underpasses, bridges, viaducts, tunnels, and other structures of insufficient clearance for their vehicle. With the vehicle height entered into the Sure Pass database, as well as including the actual measurements of each and every structure along with GPS coordinates, the design intent is to alert, and reroute the driver, should the vehicle come within a predetermined distance of a bridge or structure with a clearance too low for their vehicle.

2. Description of the Related Art

A Global Positioning System (GPS) is a space-based navigation system that provides location and time information in all weather conditions, anywhere on or near the Earth where there is an unobstructed line of sight to four or more GPS satellites. The system provides critical capabilities to military, civil, and commercial users around the world. The United States government created the system, maintains it, and makes it freely accessible to anyone with a GPS receiver.

Commercial truck drivers, bus and RV drivers have an enormous responsibility to safely maneuver their vehicle to its destination. People's lives depend on them to do so. One issue that weighs on the driver's mind while driving a high profile vehicle, is whether their vehicle will have enough clearance to safely pass under a bridge, tunnel, underpass, etc. Although the driver should know the total height including load; while driving at highway speeds, it may prove difficult to get the vehicle stopped before the structure if insufficient clearance will not permit the vehicle to pass safely underneath. Provided the driver gets the vehicle stopped in time to avoid a collision, the driver must then search for an alternate route to get to their destination, wasting valuable time and resources in the process.

Various attempts have been made to solve the above-mentioned problems such as those found in U.S. Pat. No. 6,275,773 to Jerome H. Lemelson et al.; U.S. Pat. No. 4,284,971 to Elliot G. Lowry et al.; and U.S. Pat. No. 3,419,847 to Robert S. Bonney. This art is representative of GPS and warning devices to avoid a low structure collision for trucks and vehicles with high clearance requirements. None of the above inventions and patents, taken either singly or in combination, is seen to describe the invention as claimed.

Ideally, a low clearance warning system should provide a reliable monitoring and alarm system to warn of insufficient clearance, and provide ample time to reroute their vehicle, yet would operate reliably and be manufactured at a modest expense. Thus, a need exists for a reliable GPS and warning system to avoid the above-mentioned problems.

BRIEF SUMMARY OF THE INVENTION

In view of the foregoing disadvantages inherent in the known vehicle underpass collision avoidance system art, the present invention provides a novel GPS and warning system. The general purpose of the present invention, which will be described subsequently in greater detail is to provide a reliable GPS monitoring and alarm system that would warn truckers, bus and RV drivers, approaching underpasses, bridges, viaducts, tunnels, and other structures of insufficient clearance for their vehicle.

A GPS and warning system for a vehicle is disclosed herein comprising a main body having a hollow interior volume with a computer module located within the hollow interior volume adapted to be programmed with information pertaining to existing roads, bridges, viaducts, and underpasses, and underpass clearance measurements. It also has a GPS module located within the hollow interior volume which is adapted to provide longitudinal and latitudinal position coordinates and location information of existing roads, bridges, viaducts, and underpasses. It further has at least one warning mechanism connected to a computer module which is adapted to provide a loud audible sound and flashing light to warn a driver of impending danger caused by existing roads, bridges, viaducts, and underpasses. The computer module is adapted to process information and location of existing roads, bridges, viaducts, and underpasses, and determine when to send an electronic signal to the warning mechanism to warn the driver of the vehicle of insufficient clearance of a structure.

The computer module is further adapted to prevent the vehicle from being operated until the GPS and warning device is turned on and activated. A display screen is located upon an outer surface of the main body, and is electronically connected to the computer module, to provide visual information including the height of an approaching bridge or underpass. The computer module and display screen are adapted to display alternate routes for the vehicle to travel to avoid dangers posed by existing roads, bridges, viaducts, and underpasses. The computer module will initiate the warning mechanism when the GPS and warning device is within a predetermined distance from an existing road, bridge, viaduct or underpass that poses a danger to the vehicle. A power source is located within the hollow interior volume and is connected to the computer module, GPS module, and warning mechanism.

A combination of a vehicle and a GPS and warning system comprising a vehicle including an engine and a passenger compartment, and a GPS and warning system located within the passenger compartment of the vehicle. The main body of the GPS and warning system has a hollow interior volume with a computer module located within the hollow interior volume adapted to be programmed with information pertaining to location and height of existing roads, bridges, viaducts, and underpasses, including underpass clearance measurements. It also has a GPS module located within the hollow interior volume which is adapted to provide longitudinal and latitudinal position coordinates and location information of existing roads, bridges, viaducts, and underpasses. It further has at least one warning mechanism connected to the computer module which is adapted to provide a loud audible sound and flashing light to warn a driver of impending danger caused by insufficient clearance of a structure.

The computer module determines when to send an electronic signal to the warning mechanism to warn the driver of a vehicle of impending danger. The computer module is further adapted to prevent the vehicle from being operated until the GPS and warning device is turned on and activated. A display screen is located upon an outer surface of the main body, and is electronically connected to the computer module, to provide visual information including the height of an approaching bridge or underpass, and alternate routes for the vehicle to travel to avoid dangers posed by existing roads, bridges, viaducts, and underpasses. The computer module will initiate the warning mechanism when the GPS and warning device is within a predetermined distance of an existing structure that poses a danger to the vehicle. A power source is located within the hollow interior volume and is connected to the computer module, GPS module, and warning mechanism.

The present invention holds significant improvements and serves as a GPS and warning system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, GPS and warning system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a GPS monitoring and alarm system and more particularly to a GPS and warning system as used to improve the ability of drivers of commercial vehicles, busses, and RVs to monitor approaching underpasses, bridges, tunnels, and other structures of insufficient clearance for their vehicle, and to alert and reroute the driver should the vehicle come within a predetermined distance of a bridge or structure with a clearance too low for their vehicle.

Generally speaking, the GPS and warning system is a GPS monitoring and alarm system that would warn truckers, bus and RV drivers, approaching underpasses, bridges, viaducts, tunnels, and other structures of insufficient clearance for their vehicle. With the vehicle height entered into the GPS and warning system, as well as including the actual measurements of each and every structure along with GPS coordinates, the intent is to safely alert, and reroute the driver, should the vehicle be approaching a structure with low clearance. The GPS and warning system has a prominent, glare-free LCD (Liquid Crystal Display) screen to display the height of the structure in English or Metric units as the vehicle approaches; and, at a preset distance from the structure—should the structure be too low for safe passage of the vehicle—a flashing warning light and loud, audible alarm will alert the driver to the impending danger, as well as quickly and safely reroute the vehicle.

Figure 1:
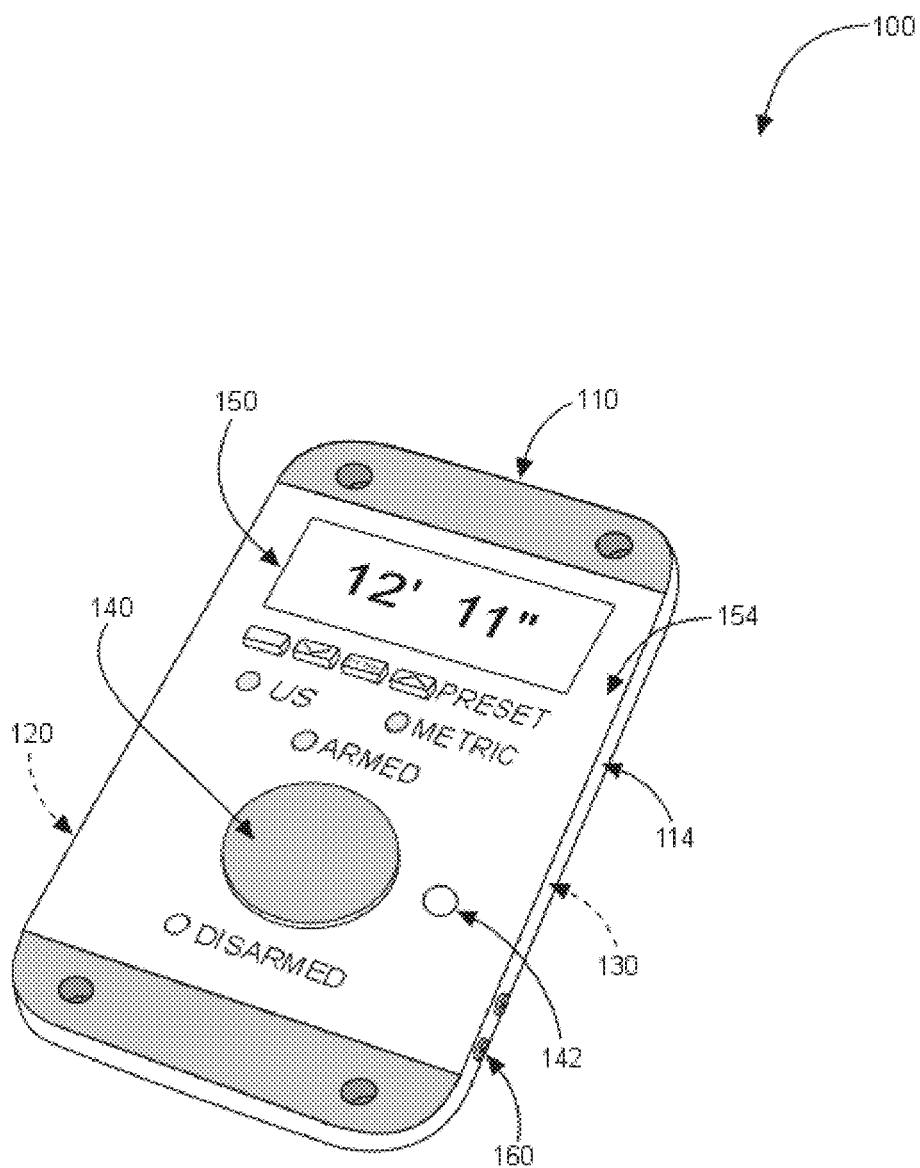
FIG. 1 shows a perspective view illustrating a GPS and warning system according to an embodiment of the present invention.

Referring to the drawings by numerals of reference there is shown in FIG. 1, a perspective view illustrating a GPS and warning system 100 according to an embodiment of the present invention.

GPS and warning system 100 for vehicle 172 is disclosed herein comprising main body 110 having hollow interior volume 114 with computer module 120 located within hollow interior volume 114 adapted to be programmed with information pertaining to existing roads, bridges, viaducts, and underpasses 180, and underpass 180 clearance measurements. It also has GPS module 130 located within hollow interior volume 114 which is adapted to provide longitudinal and latitudinal position coordinates and location information of existing roads, bridges, viaducts, and underpasses 180. It further has at least one warning mechanism 140 connected to computer module 120 which is adapted to provide a loud audible sound and flashing light 142 to warn a driver of impending danger caused by existing roads, bridges, viaducts, and underpasses 180. Computer module 120 is adapted to process information and location of existing roads, bridges, viaducts, and underpasses 180, and determine when to send an electronic signal to warning mechanism 140 to warn the driver of the vehicle 172 of insufficient clearance of a structure 176.

Figure 2:
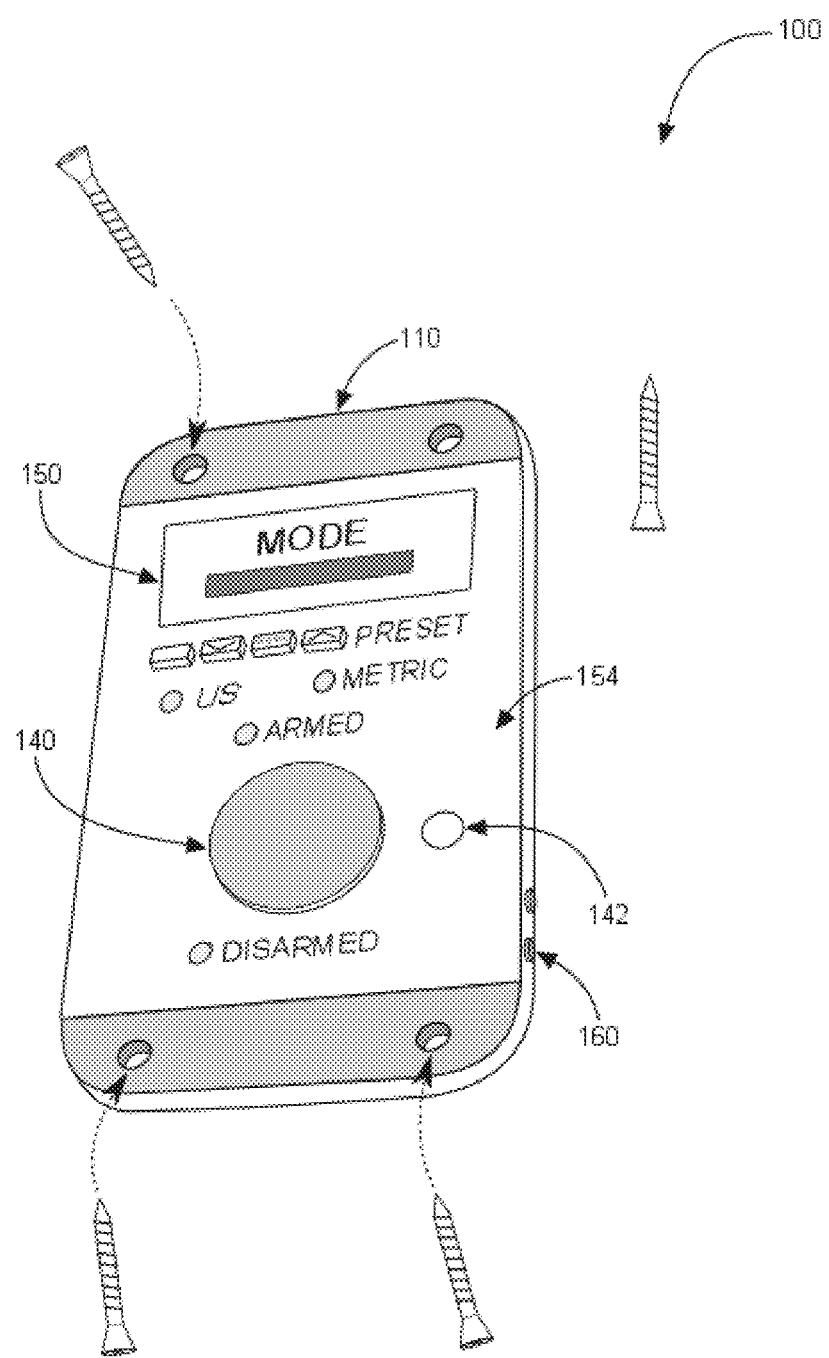
FIG. 2 is another perspective view illustrating a GPS and warning system according to an embodiment of the present invention of FIG. 1.

Referring now to FIG. 2, another perspective view illustrating a GPS and warning system 100 according to an embodiment of the present invention.

Computer module 120 is further adapted to prevent vehicle 172 from being operated until the GPS and warning system 100 is turned on and activated. Display screen 150 is located upon outer surface 154 of main body 110, and is electronically connected to computer module 120, to provide visual information including the height of an approaching bridge or underpass 180. Computer module 120 and display screen 150 are adapted to display alternate routes for vehicle 172 to travel to avoid dangers posed by existing roads, bridges, viaducts, and underpasses 180. Computer module 120 will also initiate warning mechanism 140 when GPS and warning system 100 is within a predetermined distance of an existing road, bridge, viaduct or underpass 180 that poses a danger to vehicle 172. Power source 160 is located within hollow interior volume 114 and is connected to computer module 120, GPS module 130, and warning mechanism 140.

Figure 3:
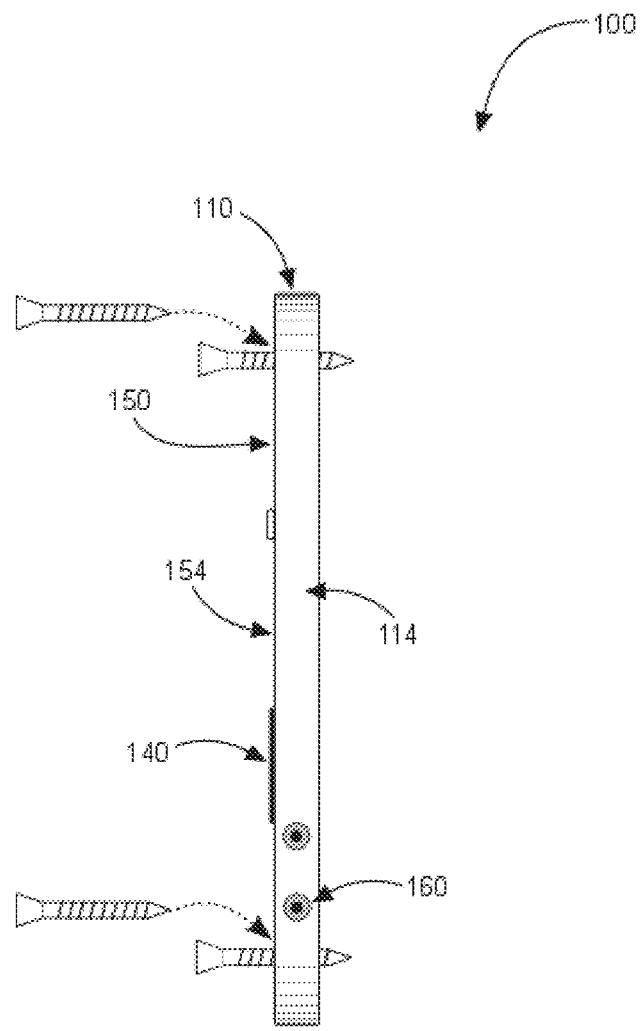
FIG. 3 is a side view illustrating GPS and warning system according to an embodiment of the present invention of FIG. 1.

Referring now to FIG. 3, a side view illustrating a GPS and warning system 100 according to an embodiment of the present invention.

Combination 170 of vehicle 172 and GPS and warning system 100 comprising vehicle 172 including an engine and a passenger compartment, and GPS and warning system 100 located within the passenger compartment of vehicle 172. Main body 110 of GPS and warning system 100 has hollow interior volume 114 with computer module 120 located within hollow interior volume 114 adapted to be programmed with information pertaining to location and height of existing roads, bridges, viaducts, and underpasses 180, including underpass 180 clearance measurements. It also has GPS module 130 located within hollow interior volume 114 which is adapted to provide longitudinal and latitudinal position coordinates and location information of existing roads, bridges, viaducts, and underpasses 180. It further has at least one warning mechanism 140 connected to computer module 120 which is adapted to provide a loud audible sound and flashing light 142 to warn a driver of impending danger caused by insufficient clearance of structure 176.

Figure 4:
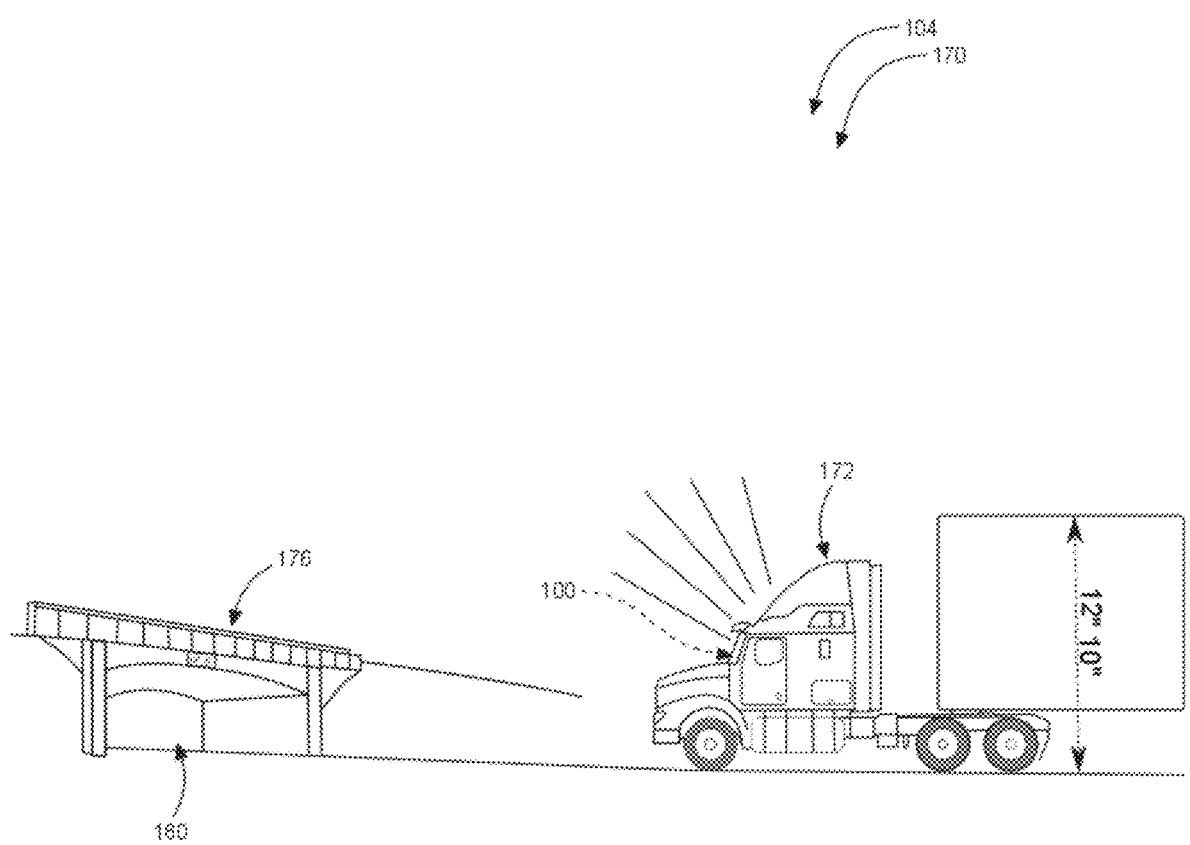
FIG. 4 is a perspective view illustrating GPS and warning system in an in-use condition according to an embodiment of the present invention of FIG. 1.

Referring now to FIG. 4, a perspective view illustrating a GPS and warning system 100 in an in-use condition 104 according to an embodiment of the present invention.

Computer module 120 determines when to send an electronic signal to warning mechanism 140 to warn the driver of impending danger. Computer module 120 is further adapted to prevent vehicle 172 from being operated until the GPS and warning system 100 is turned on and activated. Display screen 150 is located upon outer surface 154 of main body 110, and is electronically connected to computer module 120, to provide visual information including the height of an approaching bridge or underpass 180, and alternate routes for vehicle 172 to travel to avoid dangers posed by existing roads, bridges, viaducts, and underpasses 180. Computer module 120 will initiate warning mechanism 140 when GPS and warning system 100 is within a predetermined distance of an existing structure 176 that poses a danger to vehicle 172. Power source 160 is located within hollow interior volume 114 and is connected to computer module 120, GPS module 130, and warning mechanism 140.

GPS and warning system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A GPS and warning system for an automobile comprising:
   (a) a main body,
      wherein the main body forms a hollow interior volume;
   (b) a computer module,
      wherein the computer module is located within the hollow interior volume and is adapted to be programmed with information pertaining to existing roads, bridges, viaducts, and underpasses;
   (c) a GPS module,
      wherein the GPS module is located within the hollow interior volume and is adapted to provide location information of the existing roads, bridges, viaducts, and underpasses; and
   (d) at least one warning mechanism,
      wherein the at least one warning mechanism is electrically connected to the computer module and is adapted to provide a loud audible sound adapted to warn a driver of the automobile of impending danger caused by the existing roads, bridges, viaducts, and underpasses;
   (e) a display screen located upon an outer surface of the main body,
      wherein the display screen is electronically connected to the computer module, and is adapted to provide visual information to the driver of the automobile,
   wherein the visual information includes the height of an approaching bridge or underpass, wherein the computer module and the display screen are further adapted to display alternate routes for the automobile to travel to avoid dangers posed by the existing roads, bridges, viaducts, and underpasses,
      wherein the computer module is adapted to process the information and location of existing roads, bridges, viaducts, and underpasses, and determine when to send an electronic signal to the at least one warning mechanism to warn the driver of the automobile of impending danger posed by the existing roads, bridges, viaducts, and underpasses, and
      wherein the computer module is further adapted to initiate the at least one warning mechanism when the GPS and warning device is within a predetermined distance from an existing road, bridge, viaduct or underpass that poses a danger to the automobile.

2. The GPS and warning device of claim 1, wherein the information pertaining to existing roads, bridges, viaducts, and underpasses includes longitudinal and latitudinal position coordinates and underpass clearance measurements.

3. The GPS and warning device of claim 1, wherein the at least one warning mechanism is further adapted to provide a flashing light adapted to warn a driver of the automobile of impending danger caused by the existing roads, bridges, viaducts, and underpasses.

4. The GPS and warning device of claim 1, wherein the computer module is further adapted to prevent the automobile from being operated until the GPS and warning device is turned on and activated.

5. The GPS and warning device of claim 1, further comprising a power source located within the hollow interior volume and is electrically connected to the computer module, the GPS module, and the at least one warning mechanism.

6. A combination of an automobile and a GPS and warning device, the combination comprising:
  (a) an automobile including:
    (i) an engine; and
    (ii) a passenger compartment; and
  (b) a GPS and warning system located within the passenger compartment of the automobile, including:
    (i) a main body, wherein the main body forms a hollow interior volume;
    (ii) a computer module,
  wherein the computer module is located within the hollow interior volume and is adapted to be programmed with information pertaining to existing roads, bridges, viaducts, and underpasses;
    (iii) a GPS module,
  wherein the GPS module is located within the hollow interior volume and is adapted to provide location information of the existing roads, bridges, viaducts, and underpasses; and
    (iv) at least one warning mechanism,
  wherein the at least one warning mechanism is electrically connected to the computer module and is adapted to provide a loud audible sound adapted to warn a driver of the automobile of impending danger caused by the existing roads, bridges, viaducts, and underpasses; and
    (v) a display screen located upon an outer surface of the main body, is electronically connected to the computer module, and is adapted to provide visual information to the driver of the automobile,
  wherein the visual information includes the height of an approaching bridge or underpass,
  wherein the computer module and the display screen are further adapted to display alternate routes for the automobile to travel to avoid dangers posed by the existing roads, bridges, viaducts, and underpasses,
  wherein the computer module is adapted to process the information and location of existing roads, bridges, viaducts, and underpasses, and determine when to send an electronic signal to the at least one warning mechanism to warn the driver of the automobile of impending danger posed by the existing roads, bridges, viaducts, and underpasses, and
  wherein the computer module is further adapted to initiate the at least one warning mechanism when the GPS and warning device is within a predetermined distance from an existing road, bridge, viaduct or underpass that poses a danger to the automobile.

7. The GPS and warning device of claim 6, wherein the information pertaining to existing roads, bridges, viaducts, and underpasses includes longitudinal and latitudinal position coordinates and underpass clearance measurements.

8. The combination of claim 6, wherein the at least one warning mechanism is further adapted to provide a flashing light adapted to warn a driver of the automobile of impending danger caused by the existing roads, bridges, viaducts, and underpasses.

9. The combination of claim 6, wherein the computer module is further adapted to prevent the automobile from being operated until the GPS and warning device is turned on and activated.

10. The combination of claim 6, further comprising a power source located within the hollow interior volume and is electrically connected to the computer module, the GPS module, and the at least one warning mechanism.

* * * * *